United States Patent [19]

Rogers

[11] 4,098,711

[45] Jul. 4, 1978

[54] SENSOR WIRE THERMOPLASTIC COMPOUNDS

[75] Inventor: Charles H. Rogers, Ponca City, Okla.

[73] Assignee: Continental Oil Company, Ponca City, Okla.

[21] Appl. No.: 671,217

[22] Filed: Mar. 29, 1976

[51] Int. Cl.² .................. H01B 3/44; H01B 3/18; H05B 3/10; H05B 3/18
[52] U.S. Cl. .................. 252/63.2; 174/110 V; 219/504; 219/505; 252/63.5; 252/63.7; 252/65; 252/66
[58] Field of Search ............ 252/63.2, 63.5, 63.7, 252/64, 65, 66, 63, 500, 518 D, 521, 518.2; 174/110 V, 110 FC; 219/504, 505; 526/1, 3, 5

[56] References Cited

U.S. PATENT DOCUMENTS

| 2,846,559 | 8/1958 | Rosenberg | 219/505 X |
| 2,846,560 | 8/1958 | Jacoby et al. | 219/505 X |
| 3,488,328 | 1/1970 | Koyanagi et al. | 526/3 X |
| 3,586,831 | 6/1971 | Naoi et al. | 219/505 |
| 3,738,956 | 6/1973 | Glatti et al. | 526/5 X |

*Primary Examiner*—Harris A. Pitlick
*Attorney, Agent, or Firm*—Cortlan R. Schupbach, Jr.

[57] ABSTRACT

Flexible polyvinyl chloride insulation for wire is made conductive at elevated temperatures activating a sensing conductor and eliminating thermostatic controls. Conduction through the insulation is imparted by adding compounds such as nonylphenoxy (ethyleneoxy) ethanol, certain metallic salts of alcohol sulfates, mixed ortho, parasulfonamides, and liquid crystal compounds.

7 Claims, No Drawings

SENSOR WIRE THERMOPLASTIC COMPOUNDS

This invention relates to wire insulation for use in applications wherein some conductance through the insulation is necessary. More particularly, this invention relates to flexible polyvinyl chloride insulation for heating wire which is made conductive at elevated temperatures, thereby activating sensing conductors and eliminating internal thermostatic controls.

The concept of using wire in electrically heated fabric such as electric blankets and pads whereby one conductor is used as part of a heating circuit and another conductor activates an overheat control is well known in the art. The prior art is directed toward heater wire comprising a pair of spaced metallic conductors and a composition insulating at room temperature between the conductors. The composition has a high negative coefficient of thermal impedance which is provided by incorporating in the insulator from 0.04 percent to 5 percent by weight of a surface active agent compatible with the composition and having a high coefficient of thermal impedance and low resistance. The theory of the basis of electrical conduction through normally insulating compositions is well explained in U.S. Pat. No. 2,846,560 hereby incorporated into and made a part of this specification.

The prior art teaches that compounds which make normally insulating materials conductive must be surface active agent compounds having specific physical properties. Among those which are specified as being most preferred are stearyldimethylbenzyl ammonium chloride, carbonic acid, ethyleneoxide diethylamine, and diisobutyl phenoxyethyoxyethyldimethylbenzyl ammonium chloride. The prior art also teaches that generally useful compounds are surface active agents having an 80° F direct current resistance no greater than three times that of stearyldimethylbenzyl ammonium chloride and a negative coefficient of thermal impedance per 100° F in excess of 45% and useful in the range of 0.04 percent to 5 percent by weight.

While the process described above was a great advance in the art and offered many new areas of use, the process still suffers from numerous disadvantages. Chief among these disadvantages is the fact that the compounds used at the weight percentage level necessary to impart conductance at elevated temperatures often degrade and make unsuitable the polyvinyl chloride insulation. For example, the most preferred compound, stearyldimethylbenzyl ammonium chloride, seriously degrades polyvinyl chloride at the elevated temperatures necessary for extrusion to surround metallic components. For this reason alone, most commercial uses must be carried out during production runs of very short duration in order to keep the heat buildup at a minimum. One effect of the degradation is a noticeable decrease in physical properties of the compound such as color, tensile strength, and elongation. However, in most uses of this type, the compound is encased within an outer sheath and is not seen. A more important effect of the degradation is the lowering of its electrical impedance or volume resistivity at room temperature. This is true even though less than one percent is normally added to polyvinyl chloride compounds.

A still further objection to the compounds of the prior art lies in the fact that even when added to an extremely high quality 105° C polyvinyl chloride compound these disadvantages are present. It would be desirable to use an 80° C polyvinyl chloride compound, which is less expensive and perfectly adequate assuming that no degradation occurs.

It is therefore an object of the present invention to provide a process whereby electrical impedance or volume resistivity of polyvinyl chloride insulation is sufficiently high at room temperature to insulate an electrical current, yet sufficiently conductive at elevated temperatures to activate sensing conductors while being used in an 80° C polyvinyl chloride compound, and preferably at lower levels than that taught as necessary by the prior art. Other objects will become apparent to those skilled in this art as the description proceeds.

It has now been discovered in accordance with the present invention that the objects stated above can be achieved using additives selected from the group consisting of alkylphenoxypoly (ethyleneoxy) ethanol, the metallic salts of $C_{10}$ to $C_{24}$ linear alcohol sulfates, sulfonamides having the general structural formula I

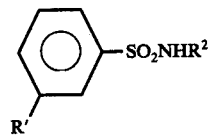

surface active fluorochemicals made by the ionic polymerization of $(C_2F_4)_nR^4$, wherein n is from 1 to 6, preferably 4 to 5, described in British Pat. No. 1,377,766, and liquid crystal dimers, as of the 9-phenylfluoryl radical. These materials impart a room temperature impedence superior to that of the presently used compounds and give a greater drop in resistivity at elevated temperatures. In addition, these compounds, at the level at which each is effective, do not cause degradation of the polyvinyl chloride insulation during the extrusion onto metallic components.

The alkyl groups designated $R^1$ and $R^2$ in general formula I contain from 1 to 5 carbon atoms. The sulfonamides are a mixture of ortho/para sulfonamides. These compounds are used in exactly the same manner as described in U.S. Pat. No. 2,846,560. However, the advantages of the use of the compounds of this invention entirely supersede the compounds of the prior art.

The sensor additives of the present invention are useful at varying weight percent levels based on total formula weight. For example, the alkylphenoxypoly (ethyleneoxy) ethanols can be used from 0.01 to 0.3, preferably 0.02 to 0.2; the calcium and magnesium salts of linear $C_{10}$-$C_{24}$ alcohols can be used from 0.01 to 0.3, preferably from 0.02 to 0.2; surface active fluorochemicals can be used from 0.005 to 0.3, preferably from 0.01 to 0.2; dimer of 9-phenylfluoryl radicals can be used from 0.01 to 0.3, preferably 0.02 to 0.2; and ortho, para sulfonamides can be used from 1 to 7, preferably 2 to 5.

Representative examples of alkylphenoxypoly (etheneoxy) ethanol are those having the general structural formula (II)

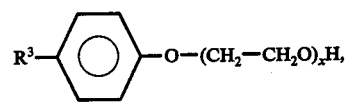

wherein $R^3$ is an alkyl group which contains from 6 to 12 carbon atoms, and wherein x is from 1 to 6, such as nonylphenoxy (ethylene oxy) ethanol, undecylphenoxy (ethyleneoxy) ethanol, decylphenoxy (ethyleneoxy) ethanol, and dodecylphenoxy (ethyleneoxy) ethanol.

Representative examples of metallic salts of $C_{10}$ to $C_{24}$ linear alcohol sulfates are magnesium and calcium salts of mixed n-hexadecyl-octadecyl alcohol sulfates.

Representative examples of the liquid crystals are the dimer of the 9-phenylfluoryl radical having the formula (III)

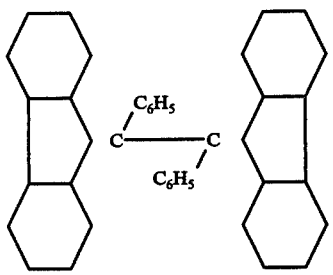

and the dimer of tris (p-nitrophenyl) methyl radical. These materials are solids, become liquid at elevated temperatures, and return to the original solid state upon cooling.

Representative examples of surface active flurochemicals are those having the formula $C_yF_{2y+1}$ and $C_yF_{2y-1}$ such as those described in British Pat. 1,377,766 produced by the ionic polymerization of $(C_2F_4)_yR^4$ wherein $R^4$ is a phenoxyalkyl group containing from 1 to 6 carbon atoms in the alkyl chains and y is 3 to 6, preferably 4 or 5. Examples of suitable phenoxyalkyls are phenoxymethyl, phenoxypropyl, and phenoxyhexyl.

The invention is more concretely described with reference to the examples below wherein all parts and percentages are by weight unless otherwise specified. The examples are intended to illustrate the present invention and are not to be construed to limit it.

In the examples below, commercially available Geon 8800 (manufacture by B. F. Goodrich Chemical Company and activated with stearyldimethylbenzyl ammonium chloride) was used as the standard. The compound contains approximately .4 weight percent of stearyldimethylbenzyl ammonium chloride conducting additive and is rated a 105° C insulation by UL designation due to the use of a trimellitate or polymeric plasticizer to counter the degradation caused by the additive. Comparative tests were carried out using an 80° C polyvinyl chloride compound having the composition shown in Table I.

TABLE I

| Ingredient | Parts/100 Resin |
|---|---|
| PVC Resin | 100.00 |
| esterified phthalic anhydride | 57.00 |
| calcium carbonate | 38.00 |
| dibasic lead phthalate | 3.00 |
| basic lead silicate sulfate | 3.00 |
| $Sb_2O_3$ (25%) complex | 3.00 |
| mineral oil | .4 |
| stearic acid | .25 |
| antioxidant | .05 |
| sensor additive | — |

The esterified phthalic anhydride is 610 phthalate sold by Continental Chemical Company. The antioxidant is Topanol CA trademarked and sold by ICI United States Inc. The precise composition of the antioxidant is not known.

Various sensor additives were tested in the formulation. The solid fluoro pentamer Monflor 51 (Trademark of ICI USI) was tested at 0.02 parts, the sulfonamide of ICI was used at 5 parts, hexadecyl tributyl phosphonium bromide was used at 0.15 parts, the sodium sulfate salt of a $C_{16}$ to $C_{18}$ alcohol (sold as Alfol 1618 by Continental Oil Company) was used at 0.04 parts and nonylphenoxy poly (ethyleneoxy) ethanol was used at 0.04 parts.

EXAMPLE 1

The above formula and sensor additives were comparatively tested. Laboratory sheets were made from dry blends by mixing on a lab mill at 305° F for 10 minutes. Sheets were pressed from the mill sheets at 310° F under 40 tons of pressure for 5 minutes then cooled under pressure for 8 minutes. The test sheets were conditioned for 24 hours in a conditioning room according to ASTM D618. The test sheets were then evaluated for volume resistivity according to ASTM D257 at both room temperatures (23° C) and at an elevated temperature (54° C). The test basically involves placing a charge of 500 volts across the sheet for a period of 1 minute and measuring the resistivity. The volume resistivity of ohm-centimeters was determined for each sample as well as a control sample which was treated in the same fashion as the test samples. The results are shown in Table II.

TABLE II

| | Volume Resistivity in ohm-cms | |
|---|---|---|
| Additive | at 23° C | at 54° C |
| None | $6.8 \times 10^{13}$ | $1.0 \times 10^{12}$ |
| Stearyl DMBA Cl[a] | $1.1 \times 10^{11}$ | $2.1 \times 10^9$ |
| HDTBP Br[b] | $2.0 \times 10^{10}$ | $7.4 \times 10^8$ |
| ALFOL 1618 Na[c] | $2.4 \times 10^{12}$ | $2.4 \times 10^{10}$ |
| Sulfonamide | $2.0 \times 10^{13}$ | $2.5 \times 10^{11}$ |
| Nonyl Pp (EtO) ethanol | $6.2 \times 10^{12}$ | $5.5 \times 10^{10}$ |
| Monflor 51 | $7.0 \times 10^{13}$ | $6.0 \times 10^{11}$ |

[a] Stearyl dimethylbenzyl ammonium chloride
[b] Hexadecyltributylphosphonium bromide
[c] Sodium salt of $C_{16}$-$C_{18}$ linear alcohol It will be noted that each of the additives gives a two-power drop in resistivity in the sensor wire at elevated temperatures. However, relative efficiency of an additive is measured by the magnitude of the change in impedence from 23° to 54° C. Using this method of determining the relative rating of the various additives, a lower percentage retained resistivity is desirable in order to more easily activate the sensing conductors at more elevated temperatures. The results of retained resistivity are shown in Table III below, wherein the abbreviations used are the same as those in Table II.

TABLE III

| Additive | Retained Resistivity at 54° C, % |
|---|---|
| Monflor 51 | 0.85 |
| Nonyl Pp (EtO) ethanol | 0.89 |
| ALFOL 1618 Na | 1.00 |
| Sulfonamide | 1.25 |
| Stearyl DMBA Cl | 1.91 |
| HDTBP Br | 3.70 |
| None | 1.47 |

It can be clearly seen that the additives of the present invention impart a superior volume resistivity compared to the compounds of the prior art.

Materials which do not require the excellent high volume resistivity of the instant invention can likewise be improved by the use of the materials disclosed herein. For example, should a lower volume resistivity at room temperature be desired, such lowered resistivity can be imparted by methods well known to those skilled in this art without degrading the PVC. One of many methods, for example, would be the substitution of a less expensive, less effective heat stabilizer, such as the replacement of dibasic lead phthalate with dibasic lead carbonate. Another well-known method is the removal of varying amounts of calcined clay which is known to impart higher volume resistivities. Combinations of these materials can be widely varied to obtain the specific volume resistivities desired. Such substitutions are well known to those skilled in this art and require only competent compounding skill without affecting the basis of the instant invention.

While certain embodiments and details have been shown for the purpose of illustrating this invention, it will be apparent to those skilled in this art that various changes and modifications may be made herein without departing from the spirit or scope of the invention.

I claim:

1. An improved polyvinyl chloride (PVC) electrical insulating composition for insulating spaced metallic conductors, said composition insulating said conductors at room temperature and allowing an electrical current to flow between said conductors at elevated temperatures, the improvement comprising incorporating into the polyvinyl chloride composition at a level where each is effective to impart reduced volume resistivity at elevated temperatures to said polyvinyl chloride composition, at least one material selected from the group consisting of calcium and magnesium salts of linear $C_{10}$-$C_{24}$ alcohol sulfates, the dimer of 9-phenylfluoryl radical having the general formula:

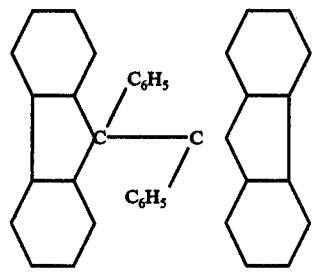

and ortho, para sulfonamides having the general formula:

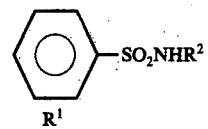

wherein $R^1$ and $R^2$ are the same or different alkyl groups containing from 1 to 5 carbon atoms.

2. An insulating composition as described in claim 1 wherein the additive incorporated therein is selected from the group consisting of calcium and magnesium salts of $C_{10}$-$C_{24}$ linear alcohol sulfates and wherein the salt is used at a concentration of from about 0.01 to about 0.3 percent by weight based on total formula weight.

3. An insulating composition as described in claim 1 wherein the additive is a sulfonamide having the general structural formula;

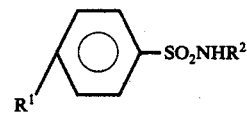

wherein $R^1$ and $R^2$ are the same or different alkyl radicals having from 1 to 5 carbon atoms and wherein the level of use is from about 1 to about 7 percent by weight based on total formula weight.

4. A composition as described in claim 1 wherein the additive is the dimer of 9-phenylfluoryl radical and wherein the additive is used at a level of from about 0.01 to about 0.3 percent by weight based on total formula weight.

5. An insulating composition as described in claim 1 wherein the metallic salts of the linear alcohols are mixed n-hexadecyl-octadecyl alcohol sulfates.

6. An insulating composition as described in claim 1 wherein the PVC is an 80° C PVC.

7. An insulating composition as described in claim 1 wherein the PVC is an 105° C PVC.

* * * * *